US009024937B2

United States Patent
Hayashi et al.

(10) Patent No.: US 9,024,937 B2
(45) Date of Patent: May 5, 2015

(54) CALIBRATION METHOD FOR IMAGE PROCESSING DEVICE, CALIBRATION DEVICE, IMAGE PROCESSING DEVICE, AND DISPLAY MODULE

(71) Applicant: Seiko Epson Corporation, Tokyo (JP)

(72) Inventors: Tadashi Hayashi, Chino (JP); Shigeki Kanazawa, Yokohama (JP)

(73) Assignee: Seiko Epson Corporation, Tokyo (JP)

( * ) Notice: Subject to any disclaimer, the term of this patent is extended or adjusted under 35 U.S.C. 154(b) by 65 days.

(21) Appl. No.: 14/056,275

(22) Filed: Oct. 17, 2013

(65) Prior Publication Data

US 2014/0111505 A1 Apr. 24, 2014

(30) Foreign Application Priority Data

Oct. 22, 2012 (JP) ................................. 2012-232574

(51) Int. Cl.
*G06F 3/038* (2013.01)
*G09G 5/00* (2006.01)
*G09G 3/20* (2006.01)

(52) U.S. Cl.
CPC ........................................ *G09G 3/20* (2013.01)

(58) Field of Classification Search
CPC .................. G09G 2330/021; G09G 2330/043; G09G 2320/041
USPC ................. 345/76–83, 87–89, 204, 214, 690; 348/38, 207.01
See application file for complete search history.

(56) References Cited

U.S. PATENT DOCUMENTS

| 6,847,374 | B2 * | 1/2005 | Matsuda ........................ 345/589 |
| 8,947,727 | B2 * | 2/2015 | Akado et al. .................... 358/1.9 |
| 2003/0193566 | A1 * | 10/2003 | Matsuda et al. ............... 348/189 |
| 2008/0228422 | A1 * | 9/2008 | Satoh .............................. 702/92 |
| 2010/0238300 | A1 | 9/2010 | Kojima |
| 2012/0229628 | A1 * | 9/2012 | Ishiyama et al. .............. 348/135 |
| 2013/0182066 | A1 * | 7/2013 | Ishimoto ......................... 348/38 |
| 2013/0258048 | A1 * | 10/2013 | Wang et al. ..................... 348/38 |

FOREIGN PATENT DOCUMENTS

| JP | A-11-261831 | 9/1999 |
| JP | A-2000-078421 | 3/2000 |
| JP | A-2001-309196 | 11/2001 |
| JP | A-2002-232732 | 8/2002 |
| JP | A-2006-086969 | 3/2006 |
| JP | A-2007-243422 | 9/2007 |
| JP | A-2009-070691 | 4/2009 |
| JP | A-2010-226369 | 10/2010 |

* cited by examiner

*Primary Examiner* — Kimnhung Nguyen
(74) *Attorney, Agent, or Firm* — Oliff PLC

(57) ABSTRACT

A method for calibrating an image processing device performs first processing to first image data, using a three-dimensional lookup table, and performing second processing to image data that has been processed by the first processing, using a one-dimensional lookup table on the output side of the three-dimensional lookup table. The method includes first setting step for setting first calibration information for each color component to have a target color temperature at the one-dimensional lookup table, second setting step for setting second calibration information for mapping the first image data to a target color space at the three-dimensional lookup table, and correction step for correcting the first calibration information based on an error from a target characteristic using image data that has been processed by the second processing.

11 Claims, 12 Drawing Sheets

CALIBRATION METHOD FOR IMAGE PROCESSING DEVICE, CALIBRATION DEVICE, IMAGE PROCESSING DEVICE, AND DISPLAY MODULE

CROSS-REFERENCE TO RELATED APPLICATIONS

This application claims priority to Japanese Patent Application No. 2012-232574 filed on Oct. 22, 2012.

The entire disclosure of Japanese Patent Application No. 2012-232574 is hereby incorporated herein by reference.

BACKGROUND

1. Technical Field

The present invention relates to calibration methods for an image processing device, calibration devices for an image processing device, image processing devices, and display modules.

2. Related Art

There are some techniques that have been proposed to achieve color reproduction that the user desires, using a display panel, such as, a liquid crystal display (hereafter, LCD) panel, an organic electroluminescence (hereafter, EL) panel and the like.

For example, Japanese laid-open patent application HEI 11-261831 (Patent Document 1) describes a technique of performing color space conversion with a three-dimensional lookup table (hereafter, 3DLUT). According to this technique, a one-dimensional lookup table (hereafter, 1DLUT) is prepared for density conversion between output density and output data, and density values from which density fluctuation is eliminated are obtained, by which stationary density fluctuation that may be caused by an image output device and the like is eliminated, and thus the accuracy in forming 3DLUT is improved.

Also, Japanese laid-open patent application 2010-226369 (Patent Document 2) describes a technique for optimizing a color reproduction method in the state that includes gradation conversion when a color conversion matrix and a 1DLUT for correcting the contrast characteristic are combined. According to this technique, color conversion can be accurately and stably performed without depending on individual experience.

However, according to the techniques described in Patent Document 1 and Patent Document 2, there is a problem in that the circuit scale would become enlarged when attempting to realize color reproduction with higher accuracy. In particular, in the case of 3DLUT, the circuit scale becomes substantially larger when the number of grids is increased, such that it is difficult to realize highly accurate color reproduction by a small circuit scale.

SUMMARY

The invention has been made in view of the technical problems described above, and an advantage of some aspects of the invention is to provide a method for calibrating an image processing device which realizes highly accurate color reproduction with a smaller circuit scale, a device for calibrating an image processing device, an image processing device, and a display module.

A first embodiment of the invention pertains to a method for calibrating an image processing device including a three-dimensional lookup table and a one-dimensional lookup table provided on an output side of the three-dimensional lookup table, the method including performing first processing to first image data, using the three-dimensional lookup table, and performing second processing to image data that has been processed by the first processing, using the one-dimensional lookup table, the method including first setting step for setting first calibration information for each color component to have a target color temperature at the one-dimensional lookup table, second setting step for setting second calibration information for mapping the first image data in a target color space at the three-dimensional lookup table, and correction step for correcting the first calibration information based on an error from a target characteristic using image data that has been processed by the second processing.

According to the first embodiment described above, the image processing device equipped with the three-dimensional lookup table and the one-dimensional lookup table provided on the output side of the three-dimensional lookup table is subject to a processing in which, after performing adjustment for target color temperature, adjustment for target color space is performed. Thereafter, fine adjustment of the adjustment for target color temperature is performed again. The processing described above can eliminate an incident in which the accuracy in color reproduction would lower due to a color temperature difference that may be present even after the adjustment for target color space has been initially, accurately performed, such that the accuracy in adjustment for target color temperature and adjustment for target color space can be improved. Accordingly, even when the circuit scale is reduced by reducing the number of grids of a three-dimensional lookup table, highly accurate color reproduction can be realized.

In accordance with a second embodiment of the invention, in the method for calibrating an image processing device in the first embodiment, the first setting step may include setting the first calibration information at the one-dimensional lookup table, in a state in which the first processing is turned off, and the second processing is turned off, based on a result of colorimetric measurement of each pure color displayed using the first image data, the second setting step may include setting the second calibration information at the three-dimensional lookup table, in a state in which the first processing is turned off, and the second processing is turned on, based on a result of colorimetric measurement of each pure color displayed using the first image data, and the correction step may include correcting the first calibration information, in a state in which the first processing is turned on, and the second processing is turned on, based on a result of colorimetric measurement of grayscale displayed using the first image data.

In the second embodiment, adjustment for target color space is performed in a state in which adjustment for target color temperature has been performed without being influenced by storing information at the three-dimensional lookup table and the one-dimensional lookup table. Then, the first calibration information set at the one-dimensional lookup table is finally corrected, in a state in which adjustment for target color temperature and adjustment for target color space have been performed. As a result, the accuracy in the adjustment for target color temperature and adjustment for target color space can be improved. Therefore, even when the circuit scale is reduced by reducing the number of grids of a three-dimensional lookup table, highly accurate color reproduction can be realized.

In accordance with a third embodiment of the invention, in the method for calibrating an image processing device in the first embodiment or the second embodiment, the first setting step may include adjusting the gain of the first calibration information, based on a result of colorimetric measurement of white color displayed using the first image data, in a state in which the first processing is turned off, and the second processing that uses the one-dimensional lookup table at which the first calibration information is set is turned on.

According to the third embodiment, the gain of a color component is adjusted according to a result of colorimetric measurement of a white point in the first setting step, such that color reproduction with even higher accuracy can be realized.

In accordance with a fourth embodiment of the invention, in the method for calibrating an image processing device in any one of the first embodiment through the third embodiment, the second setting step may include adjusting the gain of the first calibration information, based on a result of colorimetric measurement of white color displayed using the first image data, in a state in which the first processing that uses the three-dimensional lookup table at which the second calibration information is set is turned on, and the second processing that uses the one-dimensional lookup table at which the first calibration information is set is turned on.

According to the fourth embodiment, the gain of a color component is adjusted according to a result of colorimetric measurement of a white point, in the second setting step, such that color reproduction with even higher accuracy can be realized.

In accordance with a fifth embodiment of the invention, in the method for calibrating an image processing device in any one of the first embodiment through the fourth embodiment, the first calibration information after correction may be corrected again, based on a result of colorimetric measurement of grayscale displayed using the first image data.

According to the fifth embodiment, the first calibration information after correction is corrected again, based on a result of colorimetric measurement of grayscale, such that color reproduction with even higher accuracy can be realized.

In accordance with a sixth embodiment of the invention, in the method for calibrating an image processing device in any one of the first embodiment through the fifth embodiment, the correction step may include obtaining a correction amount corresponding to an input of the one-dimensional lookup table from a difference between a result of colorimetric measurement of grayscale and a target value, based on a given display characteristic in a state in which the first processing is turned off and the second processing is turned off, and correcting the first calibration information based on the correction amount.

According to the sixth embodiment, for example, using a display characteristic measured in advance, a correction amount corresponding to an input of the one-dimensional lookup table from a difference between the colorimetric measurement result and the target value, and the first calibration information is corrected using the correction amount. As a result, polygonal line characteristics of the three-dimensional lookup table and display variations on the output side can be adjusted by the first calibration information of the one-dimensional lookup table. Therefore, according to this embodiment, by increasing the number of grids of the one-dimensional lookup table while reducing the number of grids of the three-dimensional lookup table, highly accurate color reproduction can be realized by a small circuit scale.

In accordance with a seventh embodiment of the invention, in the method for calibrating an image processing device in any one of the first embodiment through the fifth embodiment, the correction step may include obtaining a correction amount corresponding to an input of the one-dimensional lookup table from a difference between a result of colorimetric measurement of grayscale and a target value, based on a given gamma characteristic, and correcting the first calibration information based on the correction amount.

According to the seventh embodiment, a correction amount corresponding to an input of the one-dimensional lookup table is obtained from a difference between a colorimetric measurement result and a target value, using, for example, modeled gamma characteristics, and the first calibration information is corrected using the correction amount. As a result, polygonal line characteristics of the three-dimensional lookup table and display variations on the output side can be adjusted by the first calibration information of the one-dimensional lookup table. Therefore, according to this embodiment, by increasing the number of grids of the one-dimensional lookup table while reducing the number of grids of the three-dimensional lookup table, highly accurate color reproduction can be realized by a small circuit scale.

An eighth embodiment of the invention pertains to a calibration device for calibrating an image processing device including a three-dimensional lookup table for performing a first processing on first image data and a one-dimensional lookup table provided on an output side of the three-dimensional lookup table for performing a second processing to image data after the first processing. The calibration device includes a colorimetric unit for performing colorimetric measurement on an image corresponding to image data that is output from the image processing device, a one-dimensional lookup table generation unit for generating first calibration information for each color component to be set at the one-dimensional lookup table to have a target color temperature based on a result of colorimetric measurement of the colorimetric unit, and a three-dimensional lookup table generation unit for generating second calibration information to be set at the three-dimensional lookup table such that the first image data is mapped to a target color space based on a result of colorimetric measurement of the colorimetry unit. In one aspect, after setting the first calibration information at the one-dimensional lookup table, the second calibration information is set at the three-dimensional lookup table, and then the first calibration information is corrected based on an error from a target characteristic obtained using the image data that has been processed by the second processing.

According to the eighth embodiment, the image processing device equipped with the three-dimensional lookup table and the one-dimensional lookup table provided on the output side of the three-dimensional lookup table is subject to a processing in which, after performing adjustment for target color temperature, adjustment for target color space is performed. Thereafter, fine adjustment is performed again to the adjustment for target color temperature. As a result, the image processing device described above can improve the accuracy in adjustment for target color temperature and adjustment for target color space. Even when the circuit scale is reduced by reducing the number of grids of a three-dimensional lookup table, highly accurate color reproduction can be realized.

A ninth embodiment of the invention pertains to an image processing device including a three-dimensional lookup table for performing a first processing on first image data and a one-dimensional lookup table provided on an output side of the three-dimensional lookup table for performing a second processing to image data after having been processed by the first processing. The one-dimensional lookup table includes first calibration information for each color component that is adjusted to have a target color temperature based on a result of colorimetric measurement of each pure color displayed using the first image data in a state in which the first processing is turned off, and the second processing is turned off, and the three-dimensional lookup table including second calibration information adjusted so as to be mapped to a target color space based on a result of colorimetric measurement of each pure color displayed using the first image data in a state in which the first processing is turned off, and the second processing is turned on. In one aspect, the first calibration information is information corrected based on a result of colorimetric measurement of grayscale to be displayed using the first image data in a state in which the first processing is turned on, and the second processing is turned on.

According to the ninth embodiment, the image processing device includes the three-dimensional lookup table and the one-dimensional lookup table provided on an output side of the three-dimensional lookup table. At this time, the three-dimensional lookup table has the second calibration information set when adjustment for target color space is performed after adjustment for target color temperature has been performed. Also, the one-dimensional lookup table has the first calibration information set when the adjustment for target color space is performed after the adjustment for target color temperature has been performed, and then again, fine adjustment to the adjustment for target color temperature is performed. As a result, even when the circuit scale is reduced by reducing the number of grids of the three-dimensional lookup table, it is possible to provide an image processing device that can improve the accuracy in adjustment for target color temperature and adjustment for target color space, and realize highly accurate color reproduction.

In accordance with a tenth embodiment of the invention, in the image processing device according to the ninth embodiment, the first calibration information may be information whose gain is adjusted based on a result of colorimetric measurement of white color displayed using the first image data, in a state in which the first processing is turned off, and the second processing that uses the three-dimensional lookup table at which the first calibration information is set is turned on.

According to the tenth embodiment, the gain of a color component is adjusted according to a result of colorimetric measurement of a white point, such that an image processing device that can realize color reproduction with even higher accuracy can be provided.

An eleventh embodiment of the invention pertains to a display module having the image processing device according to the ninth embodiment or the tenth embodiment, and a display unit that supplies image data that has been processed in the second processing to the image processing device.

According to the eleventh embodiment, a display module that is small in size and capable of highly accurate color reproduction can be provided.

DESCRIPTION OF EXEMPLARY EMBODIMENTS

Preferred embodiments of the invention are described in detail below with reference to the accompanying drawings. It is noted that the embodiments described below would not unduly limit the content of the invention recited in the scope of the patent claims. Furthermore, not all of the components to be described below may necessarily be indispensable for solving the problems to be addressed by the invention.

Image Processing Device

First Embodiment

Figure 1:
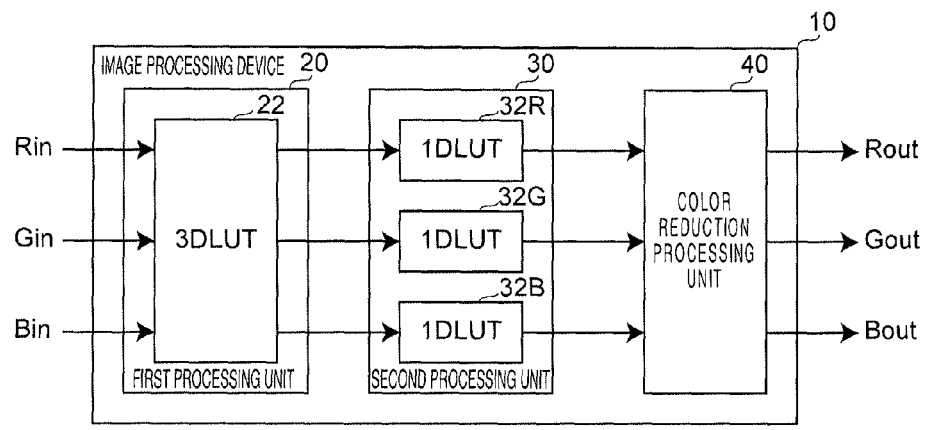
FIG. 1 is a block diagram of an exemplary configuration of an image processing device in accordance with a first embodiment of the invention.

FIG. 1 shows a block diagram of an exemplary configuration of an image processing device in accordance with a first embodiment of the invention.

The image processing device 10 in the first embodiment is connected to, for example, an imaging unit as a device for inputting image data, a display unit as a device for displaying an image corresponding to the image data outputted. The image processing device 10 renders, for example, color space conversion processing to input image data (first image data) Rin, Gin, and Bin in RGB format of standard color space (standard RGB: sRGB). Further, the image processing device 10 outputs image data of a color reproduction space of the display unit on the output side. At this time, the image processing device 10 performs calibration of the output characteristic of each color component according to the display characteristic on the output side, and outputs image data Rout, Gout, and Bout to a drive unit that supplies driving signals to the display unit, whereby faithful color reproduction for the color of an object imaged by the imaging unit is achieved at the display unit.

The image processing device 10 is equipped with a first processing unit 20, a second processing unit 30 and a color reduction processing unit 40. The first processing unit 20 has a 3DLUT 22. While performing known interpolation processing (for example, tetrahedral interpolation processing) to the input image data, using information stored in the 3DLUT 22, the first processing unit 20 performs color space conversion processing (the first processing) that performs mapping the image data to a desired color space. The second processing unit 30 has 1DLUTs 32R, 32G and 32B each being provided for each of the color components (RGB) of the input image data. The second processing unit 30 performs known interpolation processing, for each color component, to the image data provided from the first processing unit 20, using storing information in the corresponding 1DLUT, thereby performing color adjustment that adjusts each color component (the second processing). The color reduction processing unit 40 renders color reduction processing to the image data provided from the second processing section 30. The color reduction processing includes dither processing, frame rate modulation (Frame Rate Modulation: FRM) processing, or error diffusion (Error Diffusion: ED) processing.

For example, the first processing unit 20 to which 8-bit input image data for each color component is inputted outputs 10-bit image data for each color component to the second processing unit 30, and the second processing unit 30 also outputs 10-bit image data for each color component. Then, the color reduction processing unit 40 performs the aforementioned color reduction processing on the 10-bit image data for each color component, and outputs 8-bit image data for each color component after the color reduction processing.

In FIG. 1, in the 3DLUT 22, the greater the number of grids (or, grid points), the greater the scale of the hardware rapidly grows. Therefore, it is preferred to provide a composition in which the number of grids of the 3DLUT 22 is reduced, and the number of grids of each of the 1DLUTs 32R, 32G and 32B is increased. In general, the accuracy in color reproduction would decrease as the number of grids in the 3DLUT is reduced. However, in accordance with the first embodiment, by generating storing information (calibration information and parameter) and storing them in the 3DLUT 22, and the 1DLUTs 32R, 32G and 32B, as follows, highly accurate color reproduction can be realized, even though its hardware is in a substantially small scale.

Figure 2:
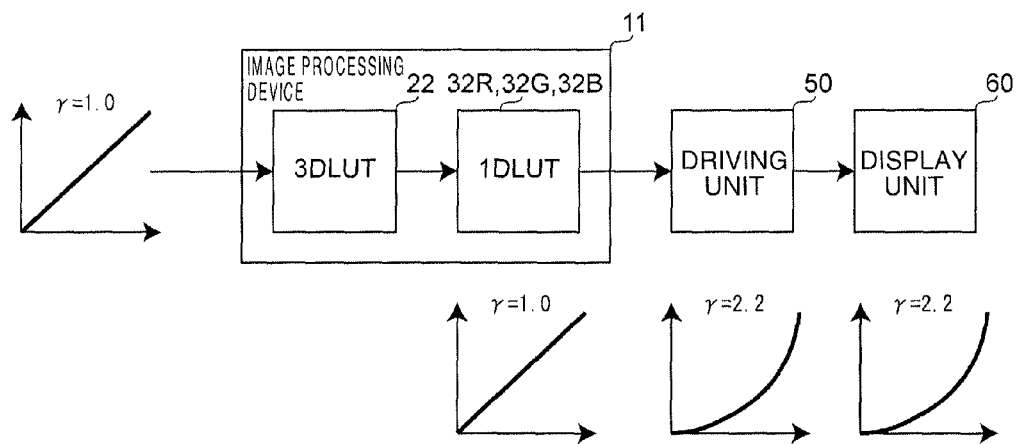
FIG. 2 is a schematic illustration for describing an operation of the image processing device in accordance with the first embodiment.

FIG. 2 shows a schematic illustration for describing an operation of the image processing device in accordance with the first embodiment. In FIG. 2, components similar to those shown in FIG. 1 shall be appended with the same reference numbers and their description shall be omitted if appropriate. Note that, in FIG. 2, the output of an image processing device 11 having 3DLUT 22, 1DLUTs 32R, 32G and 32B is connected to a drive unit 50 that supplies driving signals to the display unit 60.

When input image data with gamma value being "1.0" where its output linearly changes with respect to its input is inputted to the image processing device 11, the image processing device 11 performs color space conversion processing on the input image data, using the 3DLUT 22. Then, the image processing device 11 performs color calibration processing using corresponding one of the 1DLUTs for each of the color components. At this time, the image data after the color calibration processing has the characteristic with gamma value being "1.0". The drive unit 50 performs gamma correction on the image data supplied from the image processing device 10 with a built-in gamma control circuit, and outputs image data having the characteristic with gamma value being "2.2" to the display unit 60. As a result, the display characteristic after the drive unit 50 has the characteristic with gamma value being "2.2".

Storing information in each LUT (lookup table) that composes the image processing device in accordance with the first embodiment is decided by, for example, a calibration device provided outside the image processing device. More concretely, while turning the processing that uses the 3DLUT 22 and the processing that uses the 1DLUT 32R, 32G and 32B on and off, the calibration device decides storing information based on the result of colorimetric measurement of an image corresponding to the image data after the processing by the image processing device. Then, the calibration device stores the decided storing information in the corresponding LUT of the image processing device, whereby the characteristic of the image data that the image processing device outputs can be adjusted. Note that the expression "turning on the processing" means that the processing is rendered on an input, and the processed data is outputted, and the expression "turning off the processing" means that the processing is not rendered on an input and the data unprocessed is outputted as is.

Figure 3:
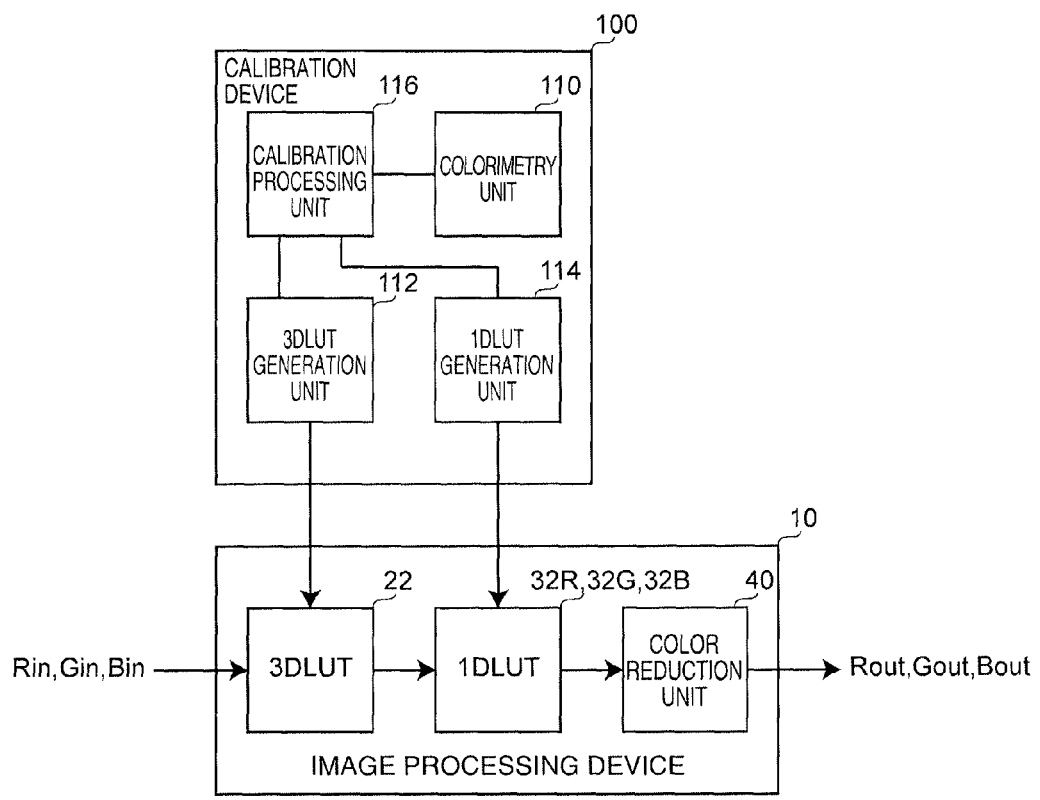
FIG. 3 is a block diagram of an exemplary configuration of a calibration device for calibrating the image processing device in accordance with the first embodiment.

FIG. 3 shows a block diagram of an exemplary configuration of a calibration device for calibrating the image processing device in accordance with the first embodiment. In FIG. 3, the image processing device 10 is illustrated together with a calibration device 100, and components similar to those shown in FIG. 1 shall be appended with the same reference numbers, and their description shall be omitted if appropriate. Note that FIG. 3 shall be described, assuming that each function of the calibration device is provided outside the image processing device 10. However, at least a part of the function of the calibration device may be provided inside the image processing device 10.

The calibration device 100 is equipped with a colorimetry unit 110, a 3DLUT generation unit 112, a 1DLUT generation unit 114, and a calibration processing unit 116. The colorimetry unit 110 performs colorimetric measurement of a display image corresponding to the image data outputted from the image processing device 10 whose 3DLUT 22 and 1DLUTs 32R, 32G and 32B are suitably controlled on and off by the calibration device 100. The 3DLUT generation unit 112 generates storing information for the 3DLUT 22 that the image processing device 10 has. The 1DLUT generation unit 114 generates storing information for each color component for each of the 1DLUTs 32R, 32G and 32B that the image processing device 10 has. The calibration processing unit 116 controls each of the parts of the calibration device 100. Also, the calibration processing unit 116 controls the image processing device 10, to turn on or off the processing that uses the 3DLUT 22, and the processing that uses the 1DLUTs 32R, 32G and 32B. Among the functions of the calibration device 100, the function of the 3DLUT generation unit 112, the 1DLUT generation unit 114, and the calibration processing unit 116 may be achieved by, for example, a personal computer.

Figure 4:
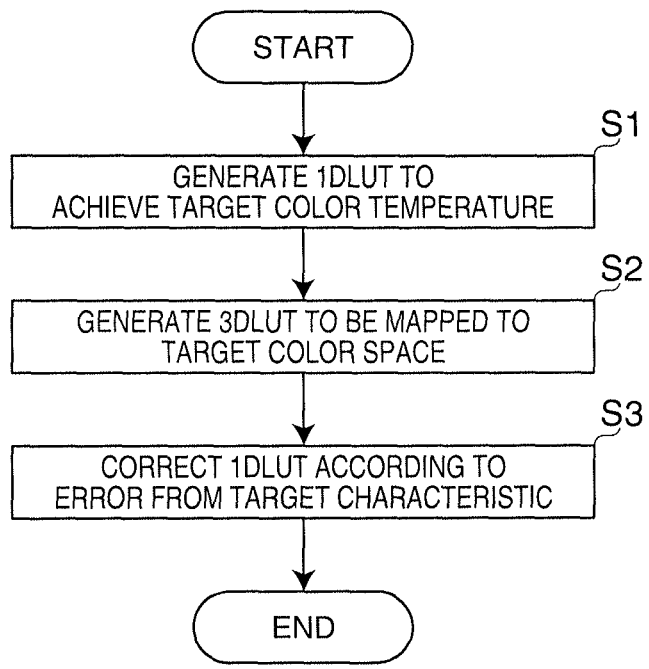
FIG. 4 is a schematic operation flow of the calibration device in accordance with the first embodiment.

FIG. 4 shows a schematic operation flow of the calibration device 100 in accordance with the first embodiment. FIG. 4 corresponds to the flow of a method for calibrating the image processing device 10. Note that the gamma correction processing performed by the drive unit and the like connected to the output side of the image processing device 10 is turned off.

The calibration device 100 has a central processing unit (hereafter, CPU) and a storage unit. Here, the storage unit may be a read only memory (ROM) or a random access memory (RAM). In this case, the CPU reads a program stored in the storage unit, and executes processing corresponding to the program, whereby the processing corresponding to each step in FIG. 4 can be executed.

First, the calibration processing unit 116 of the calibration device 100 sets first calibration information for each of the RGB color components to achieve a target color temperature (for example, 6500K) at each of the corresponding 1DLUTs (step S1, the first setting step). More specifically, in step S1, the colorimetry unit 110 in the calibration processing unit 116 performs colorimetric measurement on an image corresponding to the image data outputted from the image processing device 10 in the state in which the calibration processing unit 116 turns off the processings that use the 3DLUT 22, and the 1DLUTs 32R, 32G and 32B. Then, the 1DLUT generation unit 114 generates first calibration information to adjust the gain of each color component based on this colorimetric measurement result, and sets the same to each of the 1DLUTs 32R, 32G and 32B, respectively.

Next, the calibration processing unit 116 sets second calibration information so as to map the input image data to a target color space at the 3DLUT 32 (step S2, second setting step). More specifically, in step S2, the colorimetry unit 110 performs colorimetric measurement on an image corresponding to the image data outputted from the image processing device 10 in the state in which the processing that uses the 3DLUT 22 is turned on, and the processing that uses the 1DLUT after adjustment is turned on (the color reduction processing is also turned on) by the calibration processing unit 116. Then, the 3DLUT generation unit 112 generates the second calibration information for conversion to the target color space, based on the colorimetric measurement result, and sets the same to 3DLUT 22.

Thereafter, the calibration processing unit 116 corrects the first calibration information based on an error in the image data that has been processed, using the 3DLUT 22 and the 1DLUT 32R, 32G and 32B (step S3 and correction step), from the target characteristic. Then, the calibration processing unit 116 ends a series of the processings (END). More specifically, in step S3, the colorimetry unit 110 performs colorimetric measurement on a grayscale image corresponding to the image data outputted from the image processing device 10 in the state in which the processing that uses the 3DLUT after calibration and the processing that uses the 1DLUT after calibration are turned on (the color reduction processing is also turned on). Then, based on the colorimetric measurement result, the 1DLUT generation unit 114 corrects the first calibration information, and sets the first calibration information after having been corrected at the corresponding 1DLUT.

By performing calibration of the image processing device 10 as described above, the accuracy in calibration for target color temperature and calibration for target color space improve, and highly accurate color reproduction can be realized even when the circuit scale is reduced by using the 3DLUT with a smaller number of grids. In particular, the calibration device 100 makes it possible to accommodate variations in the display characteristic of the display unit installed on the output side of the image processing device 10.

For the calibration of the image processing device 10 described above, storing information at each LUT may be generated while finely controlling each of the components of the image processing device 10 by the calibration device 100. As a result, the image processing device 10 that is capable of color reproduction with much higher accuracy can be provided.

Figure 5:
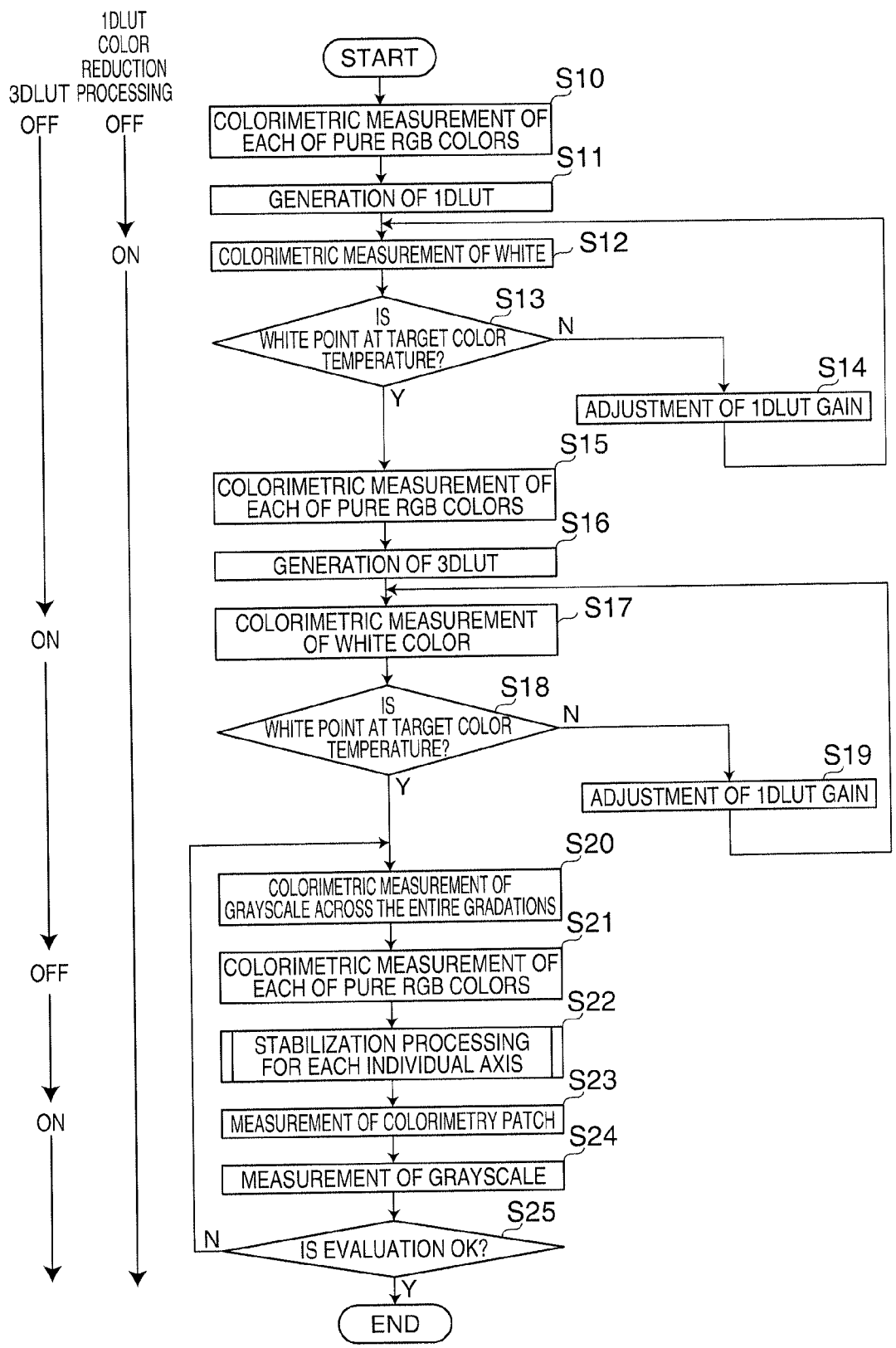
FIG. 5 is a diagram showing a detailed exemplary operation flow of the calibration device in accordance with the first embodiment.

FIG. 5 is a diagram showing a detailed exemplary operation flow of the calibration device 100 in accordance with the first embodiment. The operation shown in FIG. 5 is conducted in the state in which gamma correction processing by the drive unit or the like to be connected to the output side of the image processing device 10 is turned off. In the calibration device 100, the CPU, that reads programs stored in the storage unit, executes processing corresponding to the programs, thereby executing processing corresponding to each of the steps shown in FIG. 5.

First, the calibration device 100 turns off the color space conversion processing that uses the 3DLUT 22, turns off the color calibration processing that uses the 1DLUTs 32R, 32G and 32B, and turns off the color reduction processing.

Then, the calibration device 100 inputs image data of each pure color to the image processing device 10 as input image data, and the colorimetry part 110 performs colorimetric measurement of each of RGB pure colors corresponding to the input image data for the entire gradations (step S10).

Next, the 1DLUT generation unit 114 generates first calibration information to adjust the color balance to achieve the target color temperature based on the result of colorimetry measurement of each pure color in step S10, and sets the same to the 1DLUT for each corresponding color component (step S11).

Then, the calibration device 100 turns off the processing that uses the 3DLUT 22, turns on the processing that uses the 1DLUTs 32R, 32G and 32B, and turns on the color reduction processing. Then, the calibration device 100 inputs white image data to the image processing device 10 as input image data, and the colorimetry unit 110 performs colorimetric measurement on the white display image (step S12).

The calibration processing unit 116 judges based on the colorimetry measurement result in step S12 as to whether the white point is at the target color temperature (step S13). When it is judged in step S13 that the white point is not at the target color temperature (step S13: N), the 1DLUT generation unit 114 adjusts the coefficient to be multiplied with the first calibration information, thereby adjusting the gain of the 1DLUT (step S14), and returns to step S12.

In step S1 in FIG. 4, for example, step S10 through step S14 are performed. Here, in step S1, the gain of the first calibration information can be adjusted, in addition to the processing in FIG. 4. More specifically, in step S14, the gain of the first calibration information is adjusted, based on the result of colorimetric measurement of white color displayed using the input image data, in the state in which the processing that uses the 3DLUT 22 is turned off, and the processing that uses the 1DLUT at which the first calibration information is set is turned on.

In a manner described above, first, the color balance is adjusted to achieve the target color temperature, and then the white point is subject to colorimetric measurement, whereby other color components are adjusted.

In step S13, when it is judged that the white point is at the target color temperature (step S13: Y), the calibration device 100 turns off the processing that uses the 3DLUT 22, turns on the processing that uses the 1DLUTs 32R, 32G and 32B, and turns on the color reduction processing. Then, the calibration device 100 inputs image data of each pure color as input image data in the image processing device 10, and the colorimetry unit 110 performs colorimetric measurement of each of the RGB pure colors corresponding to the input image data (step S15).

Next, the 3DLUT generation unit 112 generates, based on the result of colorimetry measurement of each pure color in step S15, second calibration information (grid point information, etc.) such that the input image data is mapped to the target color space, and sets the same to the 3DLUT 22 (step S16).

Then, the calibration device 100 turns on the processing that uses the 3DLUT 22, turns on the processing that uses the 1DLUTs 32R, 32G and 32B, and turns on the color reduction processing. Then, the calibration device 100 inputs white image data to the image processing device 10 as input image data, and the colorimetry unit 110 performs colorimetric measurement of a white display image (step S17).

The calibration processing unit 116 judges, based on the colorimetric measurement result in step S17, as to whether the white point is at the target color temperature (step S18). In step S18, when it is judged that the white point is not at the target color temperature (step S18: N), the 1DLUT generation unit 114 adjusts the coefficient to be multiplied with the first calibration information, thereby adjusting the gain of 1DLUT (step S19), and returns to step S17.

In step S2 in FIG. 4, for example, step S15 through step S19 are performed. Here, in step S2, the gain of the first calibration information can be adjusted, in addition to the processing in FIG. 4. More specifically, in step S19, the gain of the first calibration information is adjusted, based on the result of colorimetric measurement of white color displayed using the input image data, in the state in which the processing that uses the 3DLUT 22 is turned on, and the processing that uses the 1DLUT at which the first calibration information is set is turned on.

In a manner described above, even when the color balance that has been adjusted by step S14 is shifted due to the processing that uses the 3DLUT 22, the color balance is finely adjusted again.

In step S18, when it is judged that the white point is at the target color temperature (step S18: Y), the calibration device 100 turns on the processing that uses the 3DLUT 22, turns on the processing that uses the 1DLUTs 32R, 32G and 32B, and turns on the color reduction processing. Then, the calibration device 100 inputs image data of grayscale as input image data in the image processing device 10, and the colorimetry unit 110 performs colorimetric measurement of the grayscale across the entire gradations (step S20).

Then, the calibration device 100 turns off the processing that uses the 3DLUT 22, and turns on the processing that uses the 1DLUTs 32R, 32G and 32B, and turns on the color reduction processing. Then, the calibration device 100 inputs image data of each pure color to the image processing device 10 as input image data, and the colorimetry unit 110 performs colorimetric measurement of each of the RGB pure colors corresponding to the input image data (step S21).

Then, the calibration device 100 performs individual axis stabilization processing by using the colorimetric measurement results obtained in step S20 and step S21 (step S22). By the processing in step S22, polygonal line characteristic of the 3DLUT 22 having a small number of grids and display variations occurring at the drive unit, etc. can be absorbed by the 1DLUT having a greater number of grids, and final display characteristic can be made smoother and more stable. Detailed processing flow of step S22 will be described below.

Following step S22, the calibration device 100 turns on the processing that uses the 3DLUT 22, tunes on the processing that uses the 1DLUTs 32R, 32G and 32B, and turns on the color reduction processing. Then, the calibration device 100 inputs picture data corresponding to a predetermined colorimetry patch to the image processing device 10, and the colorimetry unit 110 measures the colorimetry patch (step S23).

Furthermore, the calibration device 100 inputs image data of grayscale to the image processing device 10, and the colorimetry unit 110 performs colorimetric measurement of the grayscale across the entire gradations (step S24).

Thereafter, if it is judged based on the measurement results in step S23 and step S24 that problems exist in the color difference $\Delta E94$, the white stability, and the image quality (step S25: N), the process returns to step S20. On the other hand, when it is judged in step S25 that no problem exists (step S25: Y), the calibration device 100 ends a series of steps in the calibration flow (END).

Note that, in step S25, for example, the color difference and the white stability are calculated and compared with predetermined threshold values, and whether the calibration flow is continued or ended is decided according to the comparison result and an instruction inputted by the evaluator according to a result of evaluation of the image quality.

In step S3 in FIG. 4, for example, step S20 through step S22 are performed. As a result, the first calibration information is adjusted again, such that polygonal line characteristics of the 3DLUT 22 having a small number of grids and display variations occurring at the drive unit, etc. can be absorbed by the 1DLUTs having a greater number of grids.

Figure 6:
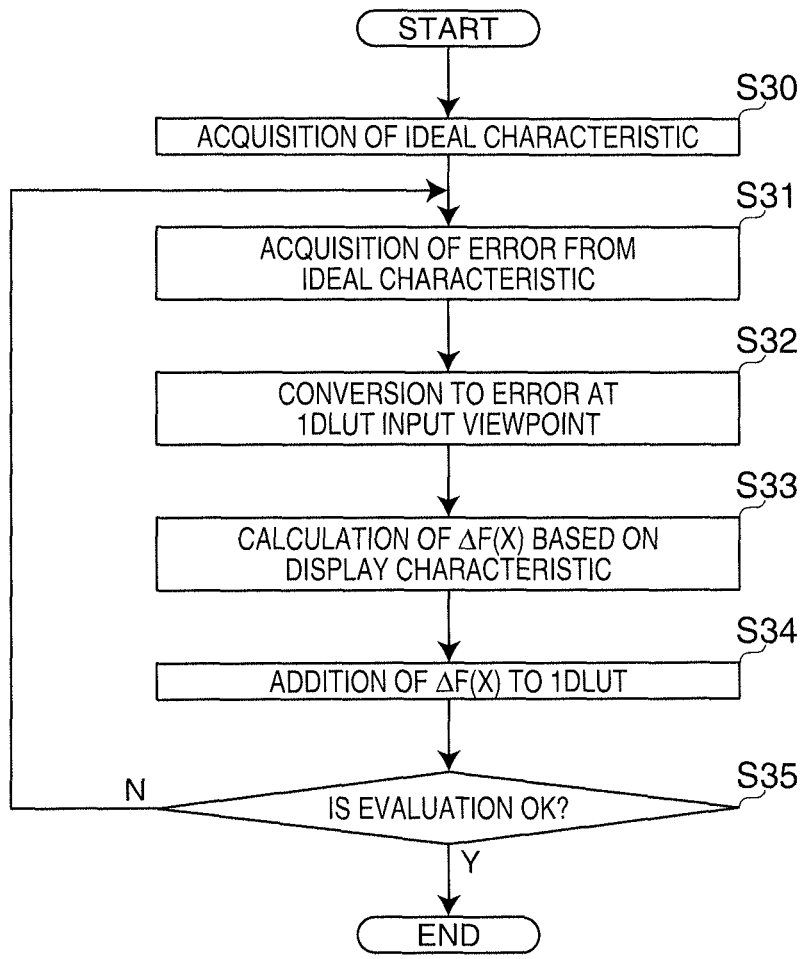
FIG. 6 is a flow chart showing an exemplary process flow of step S22 in FIG. 5.

FIG. 6 shows an exemplary processing flow of step S22 in FIG. 5. By the calibration device 100, processings corresponding to steps in FIG. 6 can be executed as the CPU reads programs stored in the storage unit, and executes processings corresponding to the programs.

The calibration device 100 obtains, at the calibration processing unit 116, ideal characteristic by using the colorimetric measurement result obtained in step S20 (step S30). In step S30, an ideal value after calibration for target color temperature and calibration for target color space is obtained, according to actual measurement value of a white point.

Next, the calibration device 100 obtains, at the calibration processing unit 116, an error from the ideal characteristic obtained in step S30, using the colorimetric measurement result obtained in step S20 (step S31).

Then, the calibration device 100 converts the error obtained in step S31 to an error at the 1DLUT input viewpoint (step S32).

Figure 7:
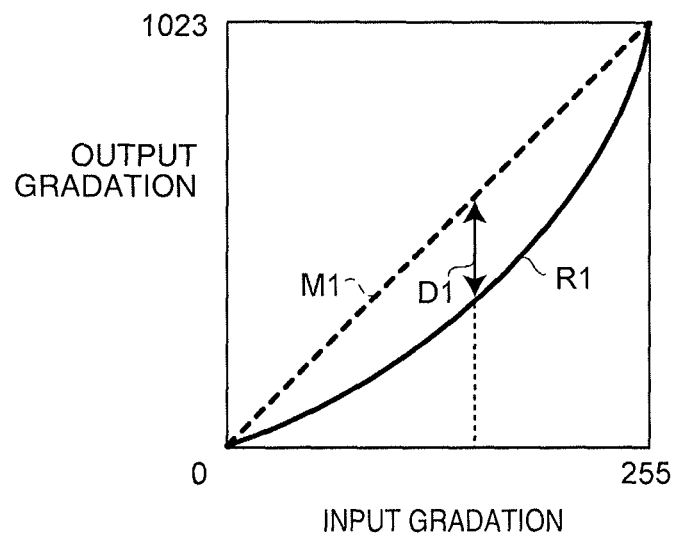
FIG. 7 is a graph for describing step S30 and step S31 in FIG. 6.

FIG. 7 shows a graph for describing step S30 and step S31 shown in FIG. 6. FIG. 7 schematically shows the relation between the ideal characteristic and the measured value, where input gradations (for example, eight bits) are plotted along the horizontal axis and output gradations (for example, ten bits) are plotted along the vertical axis.

In step S30, according to the result of colorimetric measurement of a white point in the grayscale, the ideal characteristic R1 is calculated, assuming that the gamma value is "2.2". Then, an error D1 between the colorimetric measurement result M1 along the entire gradations in the grayscale and the ideal characteristic R1 is obtained for the entire gradations. More specifically, for comparing with a XYZ value which is the result of colorimetric measurement provided from the colorimetry unit 110, the RGB pure color obtained in step S21 is converted to an XYZ value, an error in the XYZ value is obtained, and the error value is converted again to a RGB value thereby obtaining the error D1.

In the first embodiment, by reflecting the error D1 in the first calibration information of the 1DLUT, the polygonal line characteristic, etc. of the 3DLUT 22 having a small number of grids are absorbed by the 1DLUT having a larger number of grids. Therefore, it is necessary to convert the error D1 into an error at the input viewpoint of the 1DLUT, and the error D1 is converted in step S32 in FIG. 6.

Figure 8:
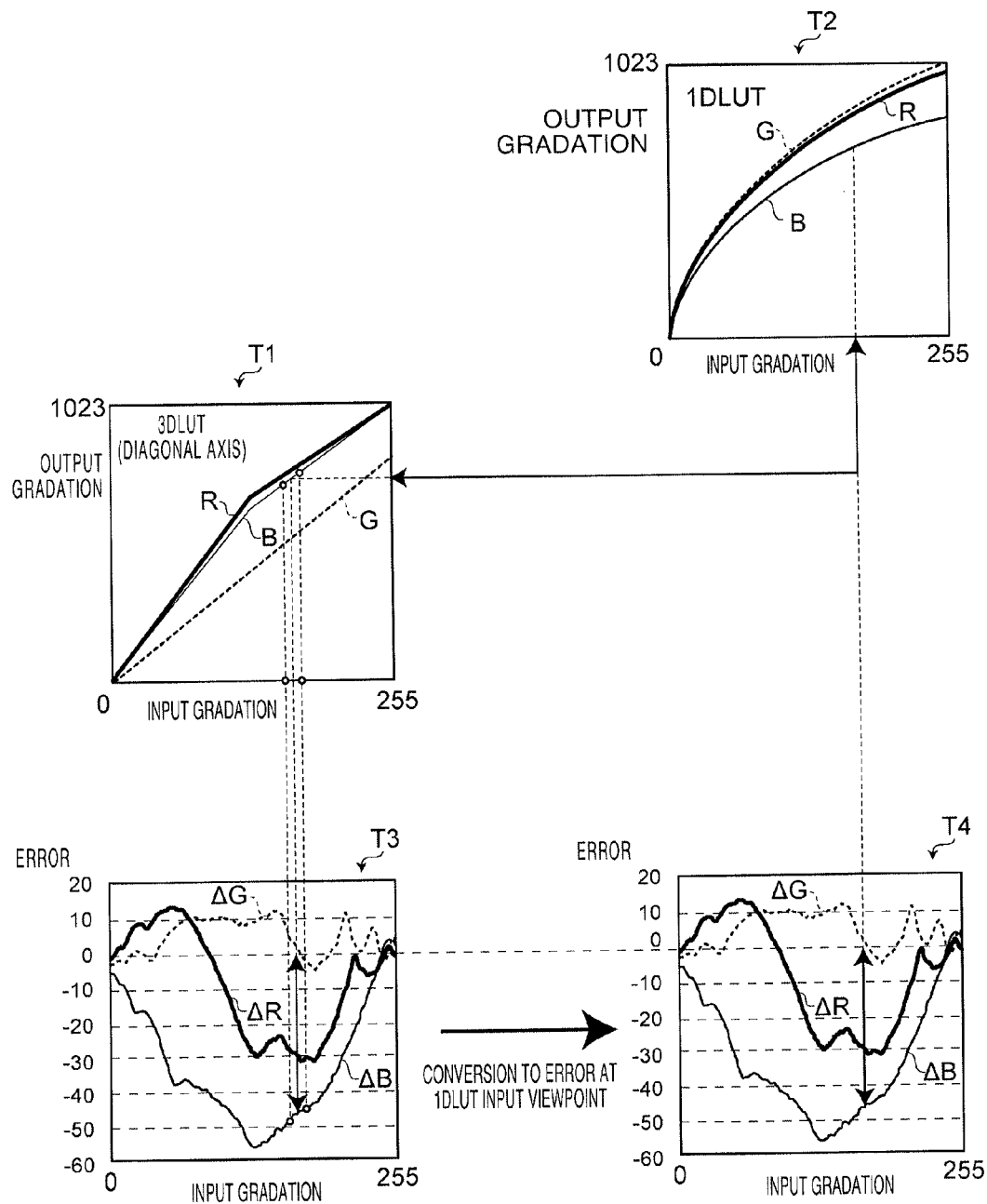
FIG. 8 shows graphs for describing step S32 in FIG. 6.

FIG. 8 shows graphs for describing step S32 in FIG. 6. FIG. 8 schematically shows the relation between input/output characteristic T1 in a diagonal axis direction of the 3DLUT 22, input/output characteristic T2 of each of the 1DLUTs 32R, 32G and 32B, measurement error characteristic T3 when image data is inputted to the 3DLUT 22, and measurement error characteristic T4 at 1DLUT input viewpoint. Each of the input/output characteristics is expressed with input gradation values plotted along the horizontal axis, and output gradation values plotted along the vertical axis. As for the measurement errors, gradation values are plotted along the horizontal axis, and measurement errors are plotted along the vertical axis, whereby changes in the error are expressed for each color component.

The input/output characteristic T1 in a diagonal axis direction of the 3DLUT 22 is obtained from the calibration information of the 3DLUT 22 generated in step S16 in FIG. 5. The input/output characteristic T2 of the 1DLUT corresponds to the calibration information of the 1DLUT generated in step S14 and step S19. The measurement error characteristic T3 corresponds to the measurement result in step S31 of FIG. 6, and is obtained for each color component.

For each of the entire input gradations of the 1DLUT, input gradations at corresponding two adjacent points in the 3DLUT 22 are decided. Therefore, based on the measurement error characteristic T3, a measurement error in the input gradation at the corresponding two points in the 3DLUT 22 is interpolated, whereby a conversion value of the measurement error (error at 1DLUT input viewpoint) can be obtained for the entire input gradations in the 1DLUT. As a result, the change in error of the 1DLUT input viewpoint corresponding to the error D1 can be obtained in a manner indicated by the measurement error characteristic T4.

After conversion to the error at the 1DULT input viewpoint in step S32, the calibration device 100 calculates a final 1DLUT correction amount $\Delta f(x)$ based on the display characteristic (step S33). The display characteristic is a display characteristic that is dependent on the drive unit and the display unit connected to the output side of the 1DLUT.

Figure 9:
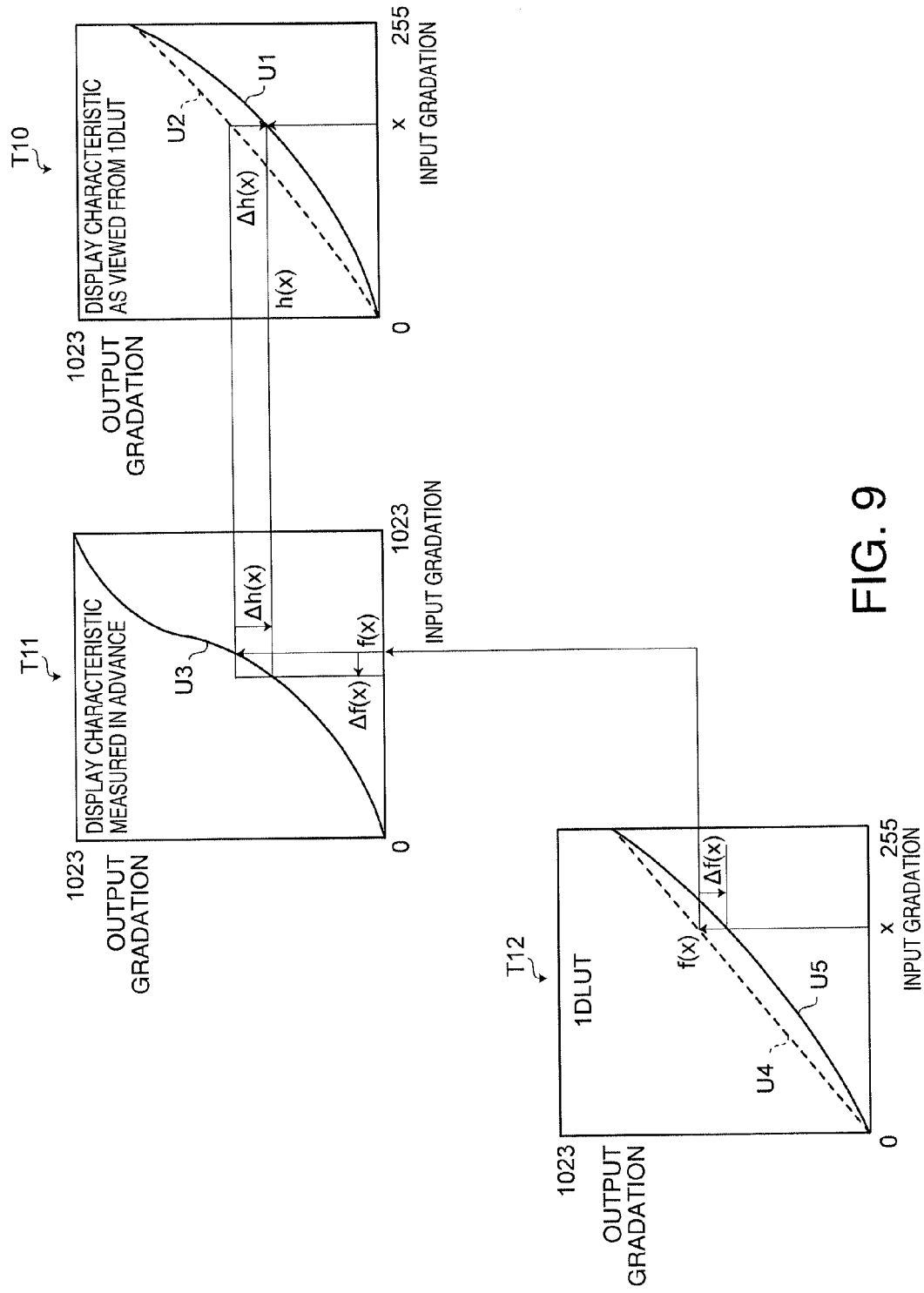
FIG. 9 shows graphs for describing step S33 in FIG. 6.

FIG. 9 shows graphs for describing step S33 of FIG. 6. FIG. 9 schematically shows the relation between display characteristic T10 as viewed from the 1DLUT input obtained in step S32, display characteristic T11 after the drive unit, and input/output characteristic T12 of the 1DLUT. Each of the input/output characteristic and display characteristics is expressed with input gradation values plotted along the horizontal axis, and output gradation values plotted along the vertical axis.

In the display characteristic T10, the ideal value is represented as U1, the actual measurement value is represented as U2, the ideal value U1 is $h(x)$ to an input x, and the error at 1DLUT viewpoint to the input x is $\Delta h(x)$. The display characteristic T11 is a display characteristic after the 1DLUT that has been measured previously in the state in which the processing that uses the 3DLUT 22 is turned off, the processing that uses the 1DLUT is turned off, and the color reduction processing is turned off. In the display characteristic T11, by using the characteristic U3 that has been previously measured, $f(x)$ that is an output of the 1DLUT and a correction amount $\Delta f(x)$ at $f(x)$ are obtained from $\Delta h(x)$ obtained in the display characteristic T10. In the input output characteristic T12, when the actual measurement value is U4, a target characteristic U5 is obtained by adding (or subtracting) $\Delta f(x)$ to (from) the actual measurement value U4, that is $f(x)$ with respect to the input x. As a result, the first calibration information stored in the 1DLUT is corrected to have the characteristic U5 in FIG. 9.

In a manner described above, in FIG. 6, following step S33, the calibration device 100 adds (or subtracts) $\Delta f(x)$ to (from) the stored information at the 1DLUT (step S34). By this, based on the display characteristic in the state in which the processing that uses the 3DLUT 22 and the processing that uses the 1DLUT are turned off, a correction amount of which an error between the result of colorimetric measurement of grayscale and the target value is converted to an error of 1DLUT input viewpoint is obtained, and the first calibration information can be corrected using the correction amount.

Thereafter, when it is judged based on a result of re-measurement that a problem is present in the color difference $\Delta E94$ and the white stability (step S35: N), the processing returns to step S31. On the other hand, when it is judged that no problem exist in both of the color difference $\Delta E94$ and the white stability (step S35: Y), a series of the processings in FIG. 6 ends (END), and step S23 in FIG. 5 is followed.

As described above, in step S22, the first calibration information is re-corrected based on the result of colorimetric measurement of a grayscale image in the state in which the processing that uses the 3DLUT 22 with the second calibration information being set, and the processing that uses the 1DLUT with the first calibration information that has been corrected in step S3 are turned on.

As described above, in accordance with the first embodiment, after adjustment for target color temperature is performed first at the 1DLUT, adjustment for target color space is performed at the 2DLUT 22, and then errors in the entire display are finally fed back to the 1DLUT. Accordingly, the accuracy in adjustment for target color temperature and adjustment for target color space is improved, and highly accurate color reproduction can be achieved even when the circuit scale is reduced by using the 3DLUT 22 having a small number of grids. Also, at the time of calibration, works of measuring the color space of display characteristic and manually calibrating while comparing the measured value with a logical value of the color space of input image data can be made unnecessary.

Second Embodiment

In the first embodiment, an example in which input image data whose output linearly changes to input is inputted in the image processing device is described. Embodiments of the invention are not limited to such a configuration. In accordance with a second embodiment, reverse gamma correction using 1DLUTs is performed in an image processing device. The configuration of the image processing device according to the second embodiment is generally the same as that of the first embodiment, and therefore its illustration and detailed description shall be omitted.

Figure 10A:
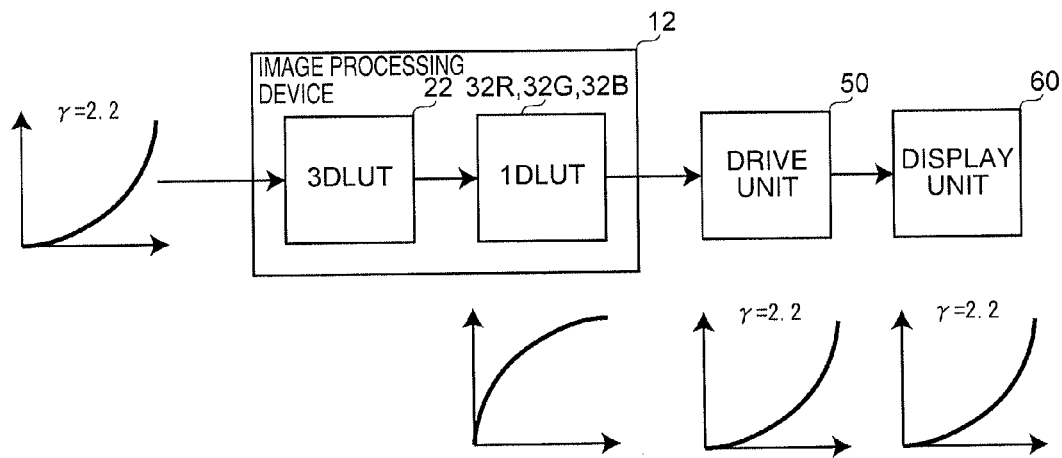
FIGS. 10A and 10B show diagrams for describing an operation of an image processing device in accordance with a second embodiment of the invention.
Figure 10B:
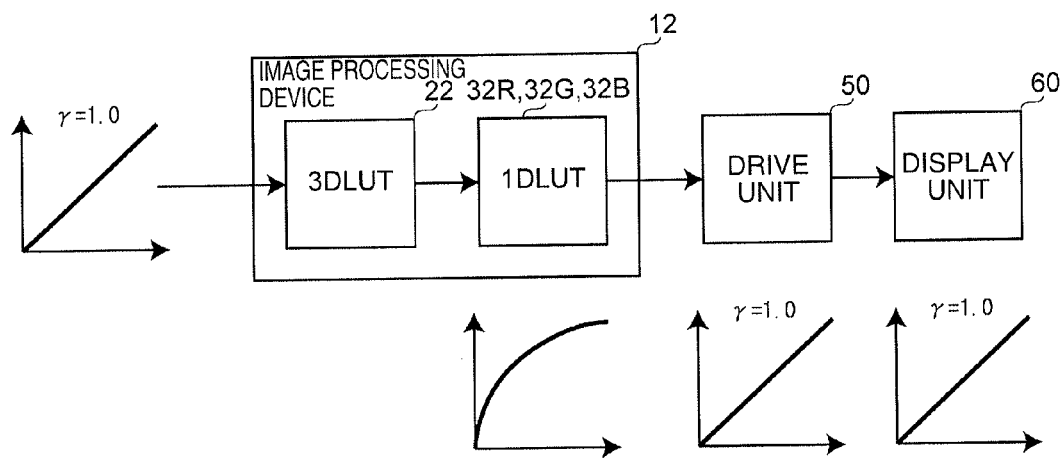

FIG. 10A and FIG. 10B schematically show diagrams for describing an image processing device in accordance with the second embodiment. In FIG. 10A and FIG. 10B, similar parts as those shown in FIG. 1 shall be appended with the same reference numbers and their description shall be omitted if appropriate. Note that, in FIG. 10A and FIG. 10B, the output of an image processing device 12 having a 3DLUT 22 and 1DLUTs 32R, 32G and 32B is connected to the drive unit 50. FIG. 10A shows a summary of the operation of the image processing device when input image data having a characteristic with gamma value being "2.2" is inputted. FIG. 10B shows a summary of the operation of the image processing device when input image data having a characteristic with gamma value being "1.0" is inputted.

As shown in FIG. 10A, when input image data having a characteristic with gamma value being "2.2" is inputted in the image processing device 12, the image processing device 12 performs color space conversion processing, using the 3DLUT 22, on the input image data. Then, the image processing device 12 performs color calibration processing for each of the color components, using the corresponding 1DLUT. At this time, reverse gamma correction is performed by the 1DLUT. The drive unit 50 performs gamma correction on image data provided from the image processing device 12, using its built-in gamma correction circuit, and outputs image data having a characteristic with gamma value being "2.2" to the display unit 60. As a result, the display characteristic after the drive unit 50 has the characteristic with gamma value being "2.2".

As shown in FIG. 10B, when input image data having a characteristic with gamma value being "1.0" is inputted in the image processing device 12, the image processing device 12 performs color space conversion processing, using the 3DLUT 22 on the input image data. Then, the image processing device 12 performs color calibration processing for each of the color components, using the corresponding 1DLUT. At this time, reverse gamma correction is performed by the 1DLUT. The drive unit 50 performs gamma correction on image data provided from the image processing device 12, using the built-in gamma correction circuit, and outputs image data having a characteristic with gamma value being "1.0" to the display unit 60. As a result, the display characteristic after the drive unit 50 has the characteristic with gamma value being "1.0".

Storing information at each LUT composing the image processing device in accordance with the second embodiment is decided by controlling to turn on or off the 3DLUT 22 and the 1DLUTs 32R, 32G and 32B with a calibration device similar to the first embodiment. Therefore, the flow of calibration of the image processing device in accordance with the second embodiment is similar to the first embodiment described with reference to FIG. 5-FIG. 8.

However, according to the second embodiment, reverse gamma correction is performed by the 1DLUT of the image processing device, such that even when input image data having a characteristic with gamma value being "1.0" is inputted, the output can be changed linearly. As a result, the display characteristic T11 described in FIG. 9 does not need to be measured in advance, and the correction amount of the 1DLUT can be obtained analytically by numerically modeling this display characteristic.

Figure 11:
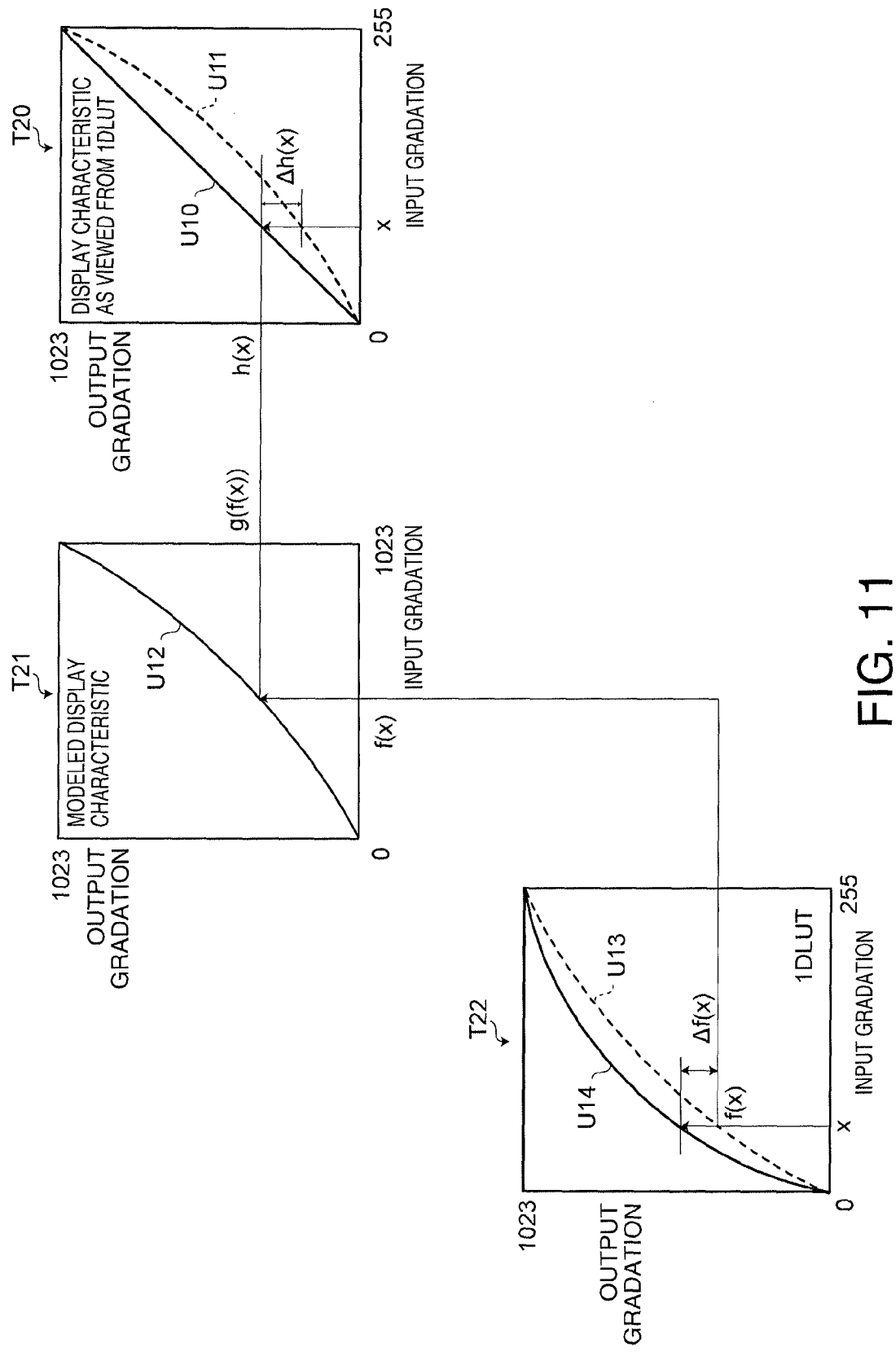
FIG. 11 shows graphs for describing step S33 in the second embodiment.

FIG. 11 shows graphs for describing step S33 in accordance with the second embodiment. FIG. 11 schematically shows the relation between display characteristic T20 at 1DLUT input viewpoint obtained in step S32, modeled display characteristic T21, and input/output characteristic T22 of the 1DLUT. Each of the input/output characteristic and display characteristics is expressed with input gradation values plotted along the horizontal axis, and output gradation values plotted along the vertical axis.

In the display characteristic T20, an ideal value is represented as U10, an actual measurement value is represented as U11, the ideal value U10 is h(x) to an input x, and an error at 1DLUT viewpoint to the input x is Δh(x). The display characteristic T21 represents a modeled characteristic U12. The input/output characteristic T22 represents a characteristic U13 of 1DLUT that is set.

Here, it is assumed that an ideal 1DLUT characteristic is f(x), a modeled display characteristic after the drive unit 50 is g(x), an ideal display characteristic is h(x), an error in the set 1DLUT from the ideal value is Δf(x), and an error in the measured display characteristic from the ideal value is Δh(x). g(f(x)+Δf(x)) given in consideration of the error at the time of measurement and g(x) in the ideal state are expressed by Formula (1) and Formula (2) below, respectively.

[Formula 1]

$$g(f(x)+\Delta f(x))=h(x)+\Delta h(x) \quad (1)$$

[Formula 2]

$$g(f(x))=h(x) \quad (2)$$

Δf(x) can be expressed by the following formula, according to Formula (1) and Formula (2).

[Formula 3]

$$\Delta f(x) = \frac{1}{g'(f(x))}\Delta h(x) \quad (3)$$

In Formula (3), f(x), g(x) and h(x) can be modeled as represented by Formula (4) below, respectively, when the gamma value is γ, and therefore the correction amount Δf(x) can be expressed by Formula (5) as follows.

[Formula 4]

$$\begin{cases} f(x) = x^{\frac{1}{\gamma}} \\ g(x) = x^{\gamma} \\ h(x) = x \end{cases} \quad (4)$$

[Formula 5]

$$\Delta f(x) = \frac{1}{\gamma}x^{\frac{1-\gamma}{\gamma}}\Delta h(x) \quad (5)$$

Therefore, according to the second embodiment, when Δh(x) is obtained in the display characteristic T20, the correction amount Δf(x) can be calculated by Formula (5). Therefore, in the second embodiment, in step S34 following step S33, the calibration device 100 only has to add (subtract) Δf(x) calculated by Formula (5) to (from) the storing information of the 1DLUT. In this manner, based on a modeled gamma characteristic, a correction amount in which an error between the result of colorimetric measurement of grayscale and the target value is converted is obtained, and the first calibration information is corrected using the correction amount.

As described above, according to the second embodiment, in addition to the effect achieved by the first embodiment, the image processing device can be analytically, optimally calibrated, without measuring the display characteristic after the drive unit in advance.

Effect of Embodiments Described Above

The effect of the embodiments described above will be described, focusing on, for example, the white stability.

Figure 12A:
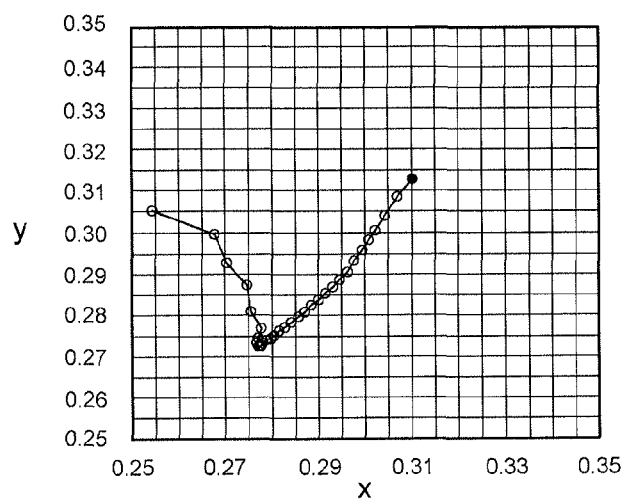
FIGS. 12A, 12B and 12C are graphs showing examples of actual measurement of white stability.
Figure 12B:
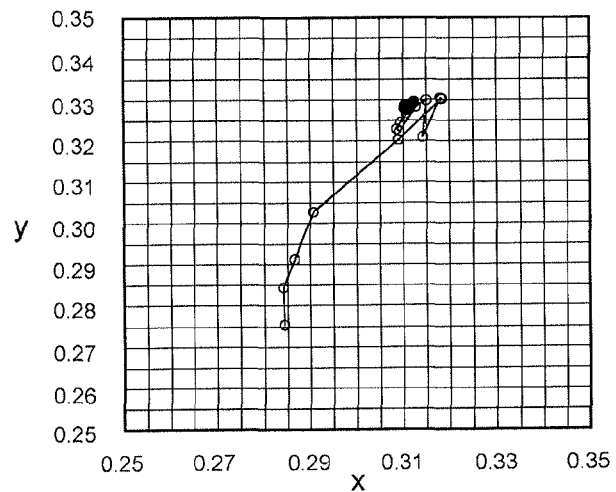
Figure 12C:
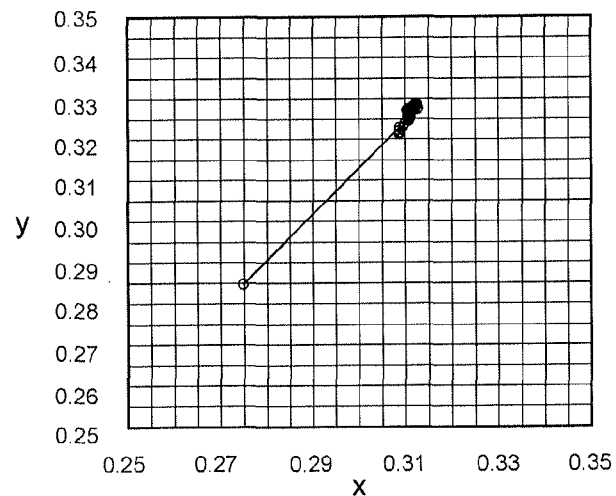

FIG. 12A, FIG. 12B and FIG. 12C show examples of measured values of white stability. FIG. 12A plots measurement values of the gray axis into xy chromaticity coordinates when the processing that uses the 3DLUT 22 is turned off, the processing that uses the 1DLUT is turned off, and the color reduction processing is turned off. FIG. 12B plots measurement values of the gray axis with image data that has undergone image processing by the image processing device 10 of the first embodiment into xy chromaticity coordinates. FIG. 12C plots measurement values of the gray axis with image data that has undergone image processing by the image processing device 10 of the second embodiment into xy chromaticity coordinates.

As shown in FIG. 12A, the measured values of white shift depending on the gradation in the xy chromaticity coordinates, while the measured values of white are generally fixed in the xy chromaticity coordinates in FIG. 12B, and the measured values of white are fixed in the xy chromaticity coordinates in FIG. 12C. In this manner, according to the first embodiment and the second embodiment, highly accurate calibration of color reproduction becomes possible by a small circuit scale. Note that, in FIG. 12B, some variations occur as the 1DLUT is re-calibrated using measurement values of the display characteristic, compared with FIG. 12C where the display characteristic is modeled as being linear.

Electronic Device

The image processing device in accordance with the first embodiment or the second embodiment can be applied to electronic devices as follows.

Figure 13:
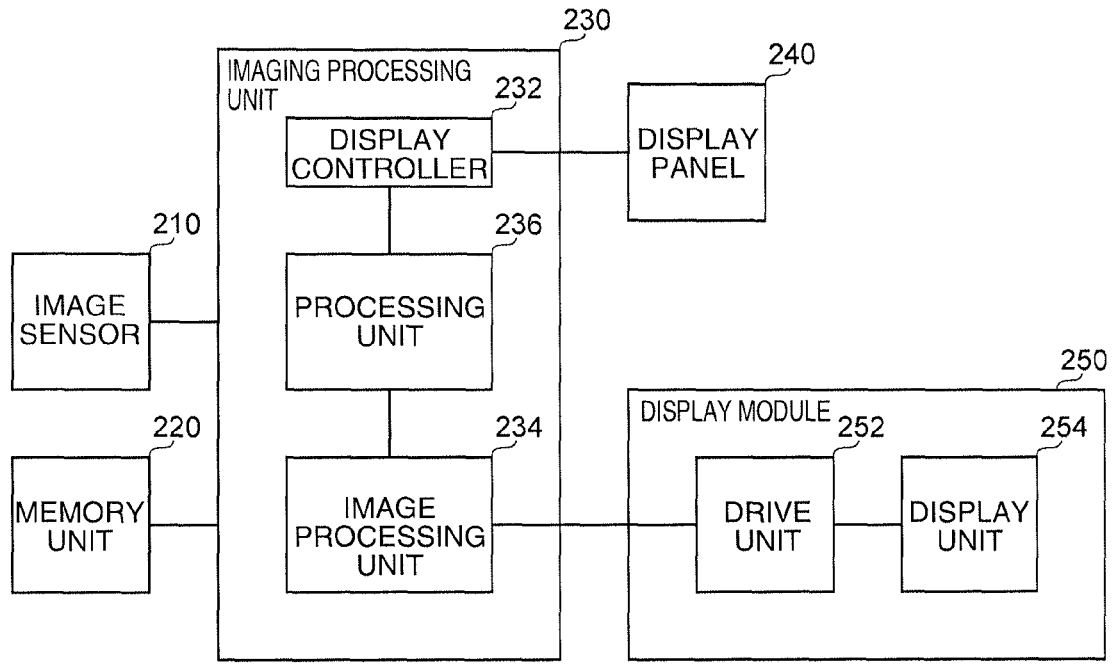
FIG. 13 is a block diagram of an exemplary configuration of an electronic apparatus in which the image processing device of the first embodiment or the second embodiment is applied.

FIG. 13 shows a block diagram of an exemplary configuration of an electronic device to which the image processing device of the first embodiment or the second embodiment is applied. FIG. 13 shows an example in which the electronic device is a digital camera.

The electronic device 200 is equipped with an image sensor 210, a memory unit 220, an imaging processing unit 230, a display panel 240, and a display module 250. The imaging processing section 230 has a display controller 232, an image processing unit 234, and a processing unit 236. The display module 250 is equipped with a drive unit 252 and a display unit 254.

The image sensor 210 converts an image formed by focusing light from an object passing through a lens or the like into a corresponding image signal and outputs the image signal, and its function can be achieved by, for example, a CCD (Charge Coupled Device), etc. The memory unit 220 stores the image signal outputted from the image sensor 210, and outputs the image signal as needed by an instruction from the imaging processing unit 230, and its function is achieved by a known memory device, etc.

The imaging processing unit 230 controls each of the units that compose the electronic device 200. The display controller 232 is connected with the display panel 240 equipped with a drive unit, performs predetermined image processing to image data read from the memory unit 220 by the control from the processing unit 236, and outputs the image data after the image processing to the display panel 240. The image processing unit 234 has the function of the image processing device in accordance with one of the embodiments described above. The image processing unit 234 performs color space conversion processing and color calibration processing to the image data read from the memory unit 220 by the control of the processing unit 236, and outputs the image data after these image processings to the display module 250. The processing unit 236 controls each of the components that form the imaging processing unit 230.

The display panel 240 displays a screen where the user operates the function setting of the electronic device 200, and displays an image photographed by the user, and its function is achieved by an LCD panel, an organic EL panel, etc.

The display module 250 may function as an electronic viewfinder (hereafter, EVF), and display an image of information that the user obtained from the image sensor 210 and is electronically projected, while the user is looking at the viewfinder. The drive unit 252 performs gamma correction to the image data from the image processing unit 234, and supplies a driving signal to the display unit 254 based on the image data after the gamma correction. The display unit 254 displays an image taken by the image sensor 210, and its function is achieved by an LCD panel, an organic EL panel, etc. Note that the electronic device 200 may have an interface unit to access an external memory medium such as a SD memory card, etc., in addition to the composition described above, and may write or read image data of photographed image through the interface unit.

Note that the electronic device 200 is equipped with an interface unit for accessing an external storage medium such as an SD memory card, in addition to the composition described above, and may write and read image data of images photographed through the interface.

By the electronic device 200 described above, its size can be reduced, highly accurate color reproduction becomes possible, and its user-friendliness can be improved.

Figure 14:
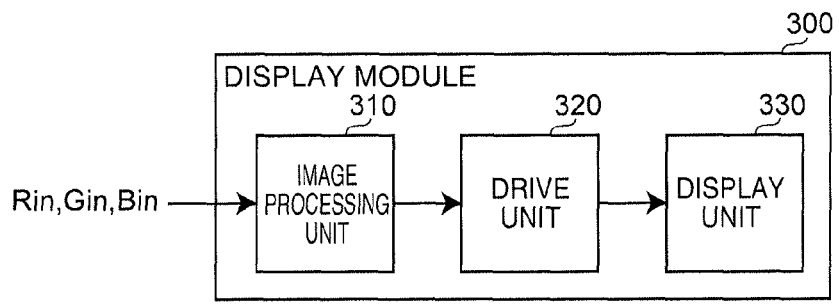
FIG. 14 is a block diagram of another exemplary configuration of an electronic apparatus in which the image processing device of the first embodiment or the second embodiment is applied.

FIG. 14 shows a block diagram of another exemplary configuration of an electronic device to which the image processing device of the first embodiment or the second embodiment is applied. FIG. 14 shows an example in which the electronic device is a display module 300.

The display module 300 is equipped with an image processing unit 310, a drive unit 320, and a display unit 330. The image processing unit 310 has the function of the image processing device in accordance with one of the embodiments described above. The image processing unit 310 performs color space conversion processing and color calibration processing to input image data, and outputs the image data after these image processings to the drive unit 320. The drive unit 320 performs gamma correction to the image data from the image processing unit 310, and supplies a driving signal to the display unit 330 based on the image data after the gamma correction. The display unit 330 displays an image corresponding to the image data inputted in the display module 300, and its function is achieved by an LCD panel, an organic EL panel, etc.

The display module 300 described above can function as the EVF described above. The display module 300 can be very small in size, but achieve highly accurate color reproduction.

Electronic devices to which the image processing device in accordance with the first embodiment or the second embodiment is applied are not limited to the devices shown in FIG. 13 or FIG. 14. For example, devices, such as, an personal digital assistants (PDA), a digital still camera, a television, a video camera, a car navigation device, a pager, an electronic notepad, an electronic paper, a calculator, a word processor, a work station, a video conferencing telephone, a POS (Point of Sale system) terminal, a printer, a scanner, a copier, a video player, and any device equipped with a touch panel, are enumerated. In the electronic device to which one of the embodiments described above is applied, highly accurate color reproduction can be achieved on a small circuit scale.

A calibration method for calibrating an image processing device, a calibration device for an image processing device, an image processing device, and a display module in accordance with the invention are described above based on some embodiments, but the invention is not limited to the embodiments described above. For example, the invention can be implemented in a variety of modes without departing from its subject matter, and the following modifications can be made.

(1) In the embodiments described above, the color space of image data inputted in the image processing device is described as being the s RGB color space, but the invention is not limited to this color space. For example, the invention is applicable to a mode in which image data of another color space, such as, the Adobe RGB color space is inputted in an image processing device in accordance with an embodiment of the invention.

(2) In the embodiments described above, an example in which image data in RGB color format is inputted in the image processing device is described. However, the invention is not limited to such a composition. For example, the invention is also applicable to cases where image data of two kinds of color components, or four or more kinds of color components are inputted, or image data in another format other than the RGB color format are inputted.

(3) In the embodiments described above, it is described that the first processing is color space conversion processing and the second processing is color calibration processing. However, the invention is not limited to those processings. At least one of the first processing and the second processing may be another processing different from the processings described in the above-described embodiments.

(4) In the embodiments described above, the invention is described as pertaining to a calibration method for calibrating an image processing device, a calibration device for an image processing device, an image processing device, and a display module. However, the invention is not limited to these method, devices, and module. For example, the invention may pertain to a program that describes a processing procedure of the calibration method for calibrating an image processing device, or a storage medium that stores such a program.

What is claimed is:

1. A method for calibrating an image processing device including a three-dimensional lookup table and a one-dimensional lookup table provided on an output side of the three-dimensional lookup table, the method including performing first processing to first image data, using the three-dimensional lookup table, and performing second processing to image data that has been processed by the first processing, using the one-dimensional lookup table, the method comprising:

first setting step for setting first calibration information for each color component to have a target color temperature at the one-dimensional lookup table;

second setting step for setting second calibration information for mapping the first image data to a target color space at the three-dimensional lookup table; and correction step for correcting the first calibration information based on an error from a target characteristic, using image data that has been processed by the second processing.

2. The method for calibrating an image processing device according to claim 1, wherein the first setting step includes setting the first calibration information at the one-dimensional lookup table, in a state in which the first processing is turned off, and the second processing is turned off, based on a result of colorimetric measurement of each pure color displayed using the first image data, the second setting step includes setting the second calibration information at the three-dimensional lookup table, in a state in which the first processing is turned off, and the second processing is turned on, based on a result of colorimetric measurement of each pure color displayed using the first image data, and the correction step includes correcting the first calibration information, in a state in which the first processing is turned on, and the second processing is turned on, based on a result of colorimetric measurement of grayscale displayed using the first image data.

3. The method for calibrating an image processing device according to claim 1, wherein the first setting step includes adjusting the gain of the first calibration information, based on a result of colorimetric measurement of white color displayed using the first image data, in a state in which the first processing is turned off, and the second processing that uses the one-dimensional lookup table at which the first calibration information is set is turned on.

4. The method for calibrating an image processing device according to claim 1, wherein the second setting step includes adjusting the gain of the first calibration information, based on a result of colorimetric measurement of white color displayed using the first image data, in a state in which the first processing that uses the three-dimensional lookup table at which the second calibration information is set is turned on, and the second processing that uses the one-dimensional lookup table at which the first calibration information is set is turned on.

5. The method for calibrating an image processing device according to claim 1, wherein the first calibration information after correction is corrected again, based on a result of colorimetric measurement of grayscale displayed using the first image data.

6. The method for calibrating an image processing device according to claim 1, wherein the correction step includes obtaining a correction amount corresponding to an input of the one-dimensional lookup table from a difference between a result of colorimetric measurement of grayscale and a target value, based on a given display characteristic in a state in which the first processing is turned off and the second processing is turned off, and correcting the first calibration information based on the correction amount.

7. The method for calibrating an image processing device according to claim 1, wherein the correction step includes obtaining a correction amount corresponding to an input of the one-dimensional lookup table from a difference between a result of colorimetric measurement of grayscale and a target value, based on a given gamma characteristic, and correcting the first calibration information based on the correction amount.

8. A calibration device for calibrating an image processing device including a three-dimensional lookup table for performing a first processing on first image data and a one-dimensional lookup table provided on an output side of the three-dimensional lookup table for performing a second processing to image data after the first processing, the calibration device comprising:

a colorimetric unit for performing colorimetric measurement of an image corresponding to image data that is output from the image processing device;

a one-dimensional lookup table generation unit for generating first calibration information for each color component to be set at the one-dimensional lookup table to have a target color temperature based on a result of colorimetric measurement of the colorimetric unit; and a three-dimensional lookup table generation unit for generating second calibration information to be set at the three-dimensional lookup table such that the first image data is mapped to a target color space based on a result of colorimetric measurement of the colorimetry unit, after setting the first calibration information at the one-dimensional lookup table, the second calibration information being set at the three-dimensional lookup table, and thereafter the first calibration information being corrected based on an error from a target characteristic obtained using the image data that has been processed by the second processing.

9. An image processing device comprising:

a three-dimensional lookup table for performing a first processing on first image data; and a one-dimensional lookup table provided on an output side of the three-dimensional lookup table for performing a second processing to image data after having been processed by the first processing, the one-dimensional lookup table including first calibration information for each color component that is adjusted to have a target color temperature based on a result of colorimetric measurement of each pure color to be displayed using the first image data in a state in which the first processing is turned off, and the second processing is turned off, and the three-dimensional lookup table including second calibration information adjusted so as to be mapped to a target color space based on a result of colorimetric measurement of each pure color to be displayed using the first image data in a state in which the first processing is turned off, and the second processing is turned on, the first calibration information being information corrected based on a result of colorimetric measurement of grayscale to be displayed using the first image data in a state in which the first processing is turned on, and the second processing is turned on.

10. The image processing device according to claim 9, wherein the first calibration information is information whose gain is adjusted based on a result of colorimetric measurement of white color displayed using the first image data, in a state in which the first processing is turned off, and the second processing that uses the three-dimensional lookup table at which the first calibration information is set is turned on.

11. A display module comprising the image processing device recited in claim 9, and a display unit that supplies image data that has been processed by the second processing to the image processing device.

* * * * *